July 6, 1943.  H. S. BAMFORD  2,323,512
CONTINUOUS PROJECTOR
Filed Aug. 14, 1940  2 Sheets-Sheet 1
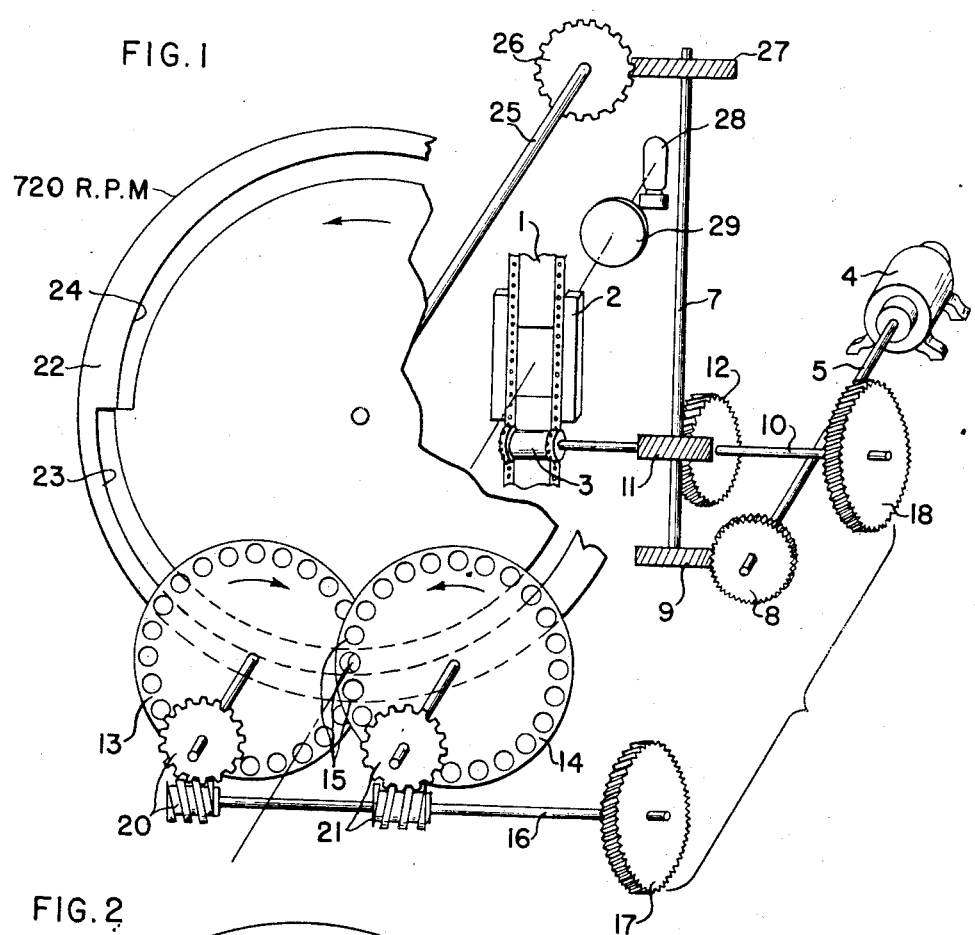
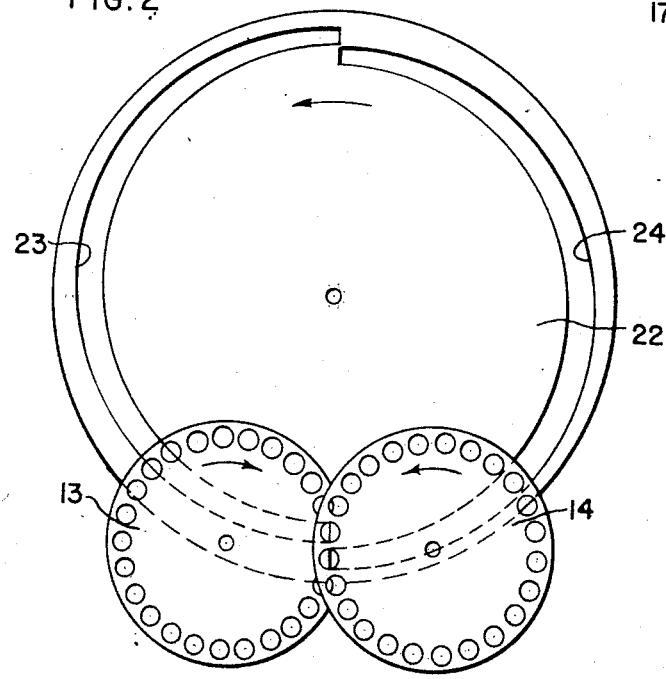
INVENTOR
HARRY S. BAMFORD
ATTORNEY July 6, 1943.  H. S. BAMFORD  2,323,512
CONTINUOUS PROJECTOR
Filed Aug. 14, 1940  2 Sheets—Sheet 2
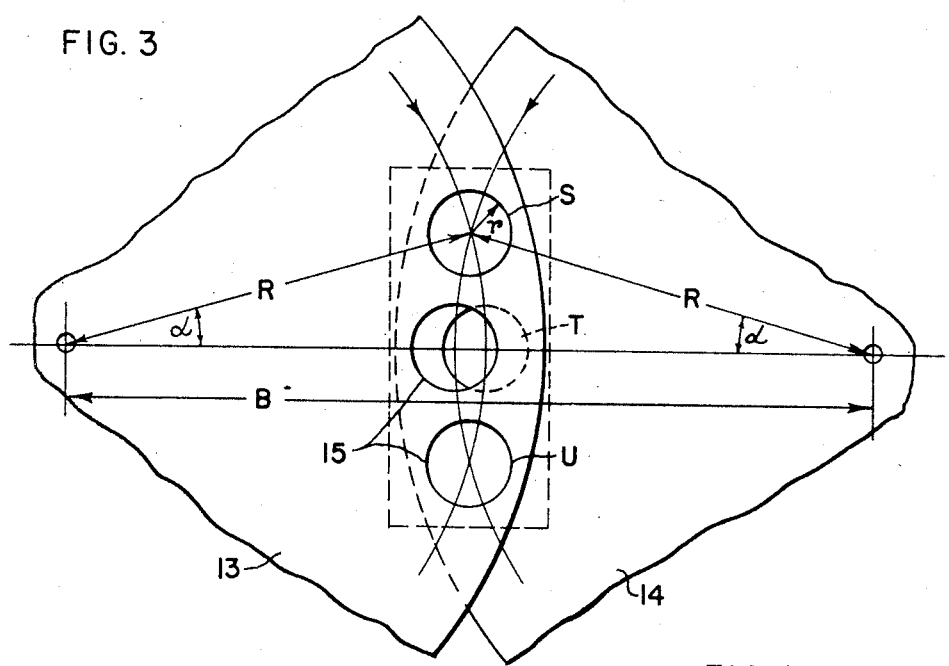
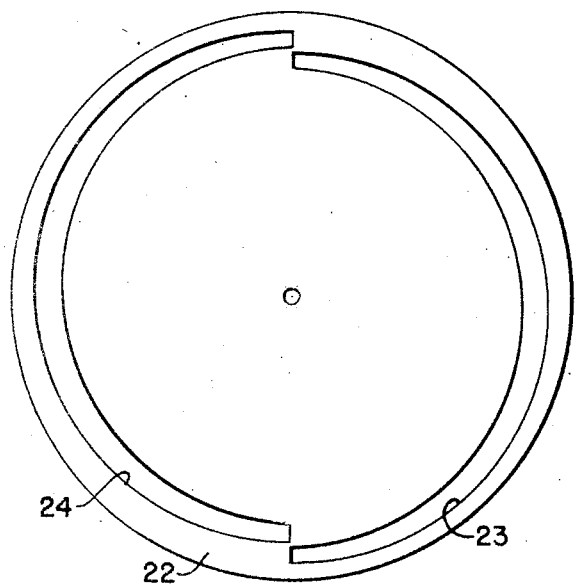
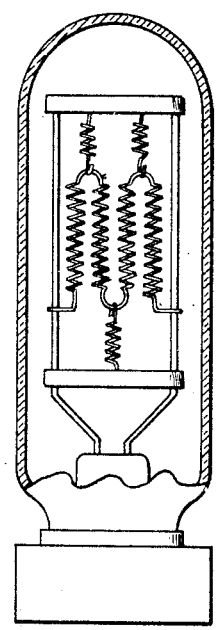
INVENTOR
HARRY S. BAMFORD
ATTORNEY Patented July 6, 1943

2,323,512

UNITED STATES PATENT OFFICE 2,323,512

CONTINUOUS PROJECTOR

Harry S. Bamford, Fort Wayne, Ind., assignor to Farnsworth Television and Radio Corporation, a corporation of Delaware Application August 14, 1940, Serial No. 352,575

3 Claims. (Cl. 88—16.8)

This invention relates to continuous projectors for motion picture films, and more particularly relates to a continuous projector in which undesirable fluctuations of the light flux emanating from the projector are eliminated.

The present application is a continuation-in-part of application Serial No. 260,077, entitled Continuous projector, filed March 6, 1939, by H. S. Bamford and its subject matter is similar to that disclosed in the copending application Serial No. 352,576, filed August 14, 1940.

In projectors of this type, a continuous motion is imparted to the film to cause it to pass through a film gate at a substantially uniform rate of speed. The film motion is continuously compensated by means of an optical arrangement to produce a stationary projected image of the film. For use in combination with certain television apparatus, only partial compensation of the film motion may be effected. Generally, a plurality of moving optical arrangements is used for compensating the film motion which is successively employed for producing the projected image. In certain types of optical compensating arrangements, the effective aperture of the individual optical systems varies during the period of its effectiveness, which causes undesirable fluctuations in the light flux emanating from the projector and consequently causes flickering of the projected image.

It is an object of the present invention, therefore, to provide an improved continuous projector which is capable of producing a projected image free from flicker.

In accordance with the present invention, there is provided a continuous projector for motion picture film comprising means for imparting a continuous motion to a film, a source of light for illuminating the film, and a plurality of optical systems arranged successively to project images of the film. Means are also provided for disclosing varying areas of selected ones of the optical systems and means for projecting an image of the light source substantially in the plane of the selected systems. The area of the selected systems is varied in accordance with the relative positions of the selected systems with respect to the image of the light source, thereby at least partially to eliminate undesirable variations in the light flux emanating from the projector.

For a better understanding of the invention, together with other and further objects thereof, reference is made to the following description taken in connection with the accompanying drawings, and its scope will be pointed out in the appended claims.

In the accompanying drawings:

Fig. 1 is a schematic perspective view of the essential elements of a continuous projector embodying the present invention;

Fig. 2 shows the relative position of the optical systems for compensating the film motion and the selecting device;

Fig. 3 illustrates in detail the relative position of the optical systems;

Fig. 4 shows a selecting device for disclosing varying areas of selected optical systems; and Fig. 5 shows a preferred light source comprising an incandescent filament.

Referring now more particularly to Fig. 1 of the drawings, there is provided a film 1 guided in a film gate 2 and driven by a sprocket gear 3. For the purpose of imparting a continuous motion to the film 1, there is provided a motor 4 driving a main drive shaft 5 coupled to a vertical shaft 7 by means of a pair of helical right angle gears 8, 9 and coupled to a horizontal shaft 10 by means of a second pair of helical right angle gears 11, 12. The film drive sprocket 3 is rigidly coupled to the shaft 10 and is thus driven by the motor 4 by way of the gear pairs 8, 9 and 11, 12 to impart a continuous motion to the film.

For the purpose of compensating the film motion there is provided a pair of lens discs 13 and 14, each carrying 24 spherical lenses 15. For driving the lens discs in opposite directions and in accordance with the film motion, there is provided a shaft 16 coupled to the shaft 10, to which the film drive sprocket 3 is coupled, by means of a pair of gears 17 and 18 which comb together as indicated in the drawing by the bracket. The lens discs 13 and 14 are coupled to the shaft 16 by means of two worm gears 20, 21, each comprising a worm and a worm wheel and adapted to drive the discs in opposite directions as indicated by the arrows.

For successively selecting certain ones of the lenses 15 and disclosing varying areas thereof, there is provided a shutter 22 having slots 23 and 24 of equal length but of varying width. The shutter 22 is mounted on a shaft 25, which is coupled to the shaft 7 by means of a pair of helical right angle gears 26, 27 and is driven in accordance with the film motion and the motion of the lens discs 13 and 14.

For the purpose of illuminating the film, there is provided an incandescent light source 28 and a condenser lens 29 on the optical axis of the system and in alignment with the opening of the film gate 2, the lens discs 13 and 14, and the shutter 22.

In operation, the film 1 is illuminated by light from the source 28 condensed by the condenser 29, and an optical image of the light source is projected substantially in the plane of the lens discs 13 and 14. The film 1 is moved downward through the gate 2, at the uniform rate of 24 film frames per second, by means of the drive sprocket 3 driven by the motor 4 by way of gears 8, 9 and 11, 12 mounted on shafts 5, 7 and 10, respectively. The lens discs 13 and 14 are rotated in opposite directions and in accordance with the film motion by means of worm gears 20 and 21 coupled to the shaft 16 which, in turn, is coupled with the film driving shaft 10 by means of gears 17, 18. At 24 lenses per lens disc, the discs are rotated at 60 revolutions per minute. A single pair of at least partially overlapping lenses 15 of the lens discs 13 and 14 are disclosed by one of the slots 23 and 24 of the shutter 22. The shutter 22 is rotated at 720 revolutions per minute by means of a shaft 25 coupled to the film drive shaft 10 by means of two pairs of helical right angle gears 10, 12 and 26, 27. The slotted apertures 23 and 24 of the shutter 25 disclose only one pair of lenses at any time and follow the selected pair of lenses along its travel in the vertical direction through a predetermined angle in order to compensate the film motion. After this angle is completed, this pair of lenses is occulted and a successive pair disclosed. At a rate of film travel of 24 film frames per second and 60 revolutions per minute of the film discs carrying 24 lenses, and a speed of 720 revolutions per minute for the shutter with two equally long slots, each selected lens pair is disclosed for $\tfrac{1}{24}$ second.

Fig. 3 more clearly shows the relative position of the lenses of lens discs 13 and 14 during their travel through a predetermined angle of rotation. In this figure, the image of the light source in the plane of the discs 13 and 14 is indicated by the dotted rectangle. The lens discs may be so arranged that a pair of corresponding selected lenses completely overlap at a certain angle of rotation, as shown by position S in Fig. 3, at which this pair of lenses may be fully disclosed by one of the slots 23 or 24 in the shutter 22. In the course of further rotation of the lens discs, the lenses move along circles about the lens disc centers and no longer completely overlap as shown in position T after they have completed one-half of their useful angle of rotation. At the end of this angle, these lenses again completely overlap, as is indicated in position U. Since the effective aperture of the optical system depends upon the area of the overlapping lenses, it is readily apparent that this aperture varies considerably when the relative position of the lenses with respect to the image of the light source is varied. The following expression can be derived for the effective area A of the lenses:

$$A = \frac{\pi r^2}{90°} \arccos \frac{B - 2R \cos \alpha}{2r} - \frac{1}{2}(B - 2R \cos \alpha)\sqrt{4r^2 - (B - 2R \cos \alpha)^2}$$

whereby R = the radius of each lens disc; r = the radius of each lens; B = the distance between lens disc centers; A = the angle of rotation. This change in aperture of the optical system naturally produces an undesirable fluctuation in the light flux emanating from the projector.

Likewise, the intensity of the image of the light source also is not constant throughout its area, particularly in the case of an incandescent light source as shown in Fig. 5, since this light source will be brighter in the center than at the top and bottom of the filament. This also introduces an undesirable fluctuation in the light flux emanating from the projector. By varying the width of slots 23 and 24 in the shutter 22 in a predetermined manner, the disclosed area of the selected lenses is continuously varied in such a manner as to compensate for the variation in area of overlapping lenses and the nonuniform intensity distribution of the light source. A shutter 22 with slots 23 and 24 of varying width is shown grossly exaggerated in Fig. 4 in order clearly to illustrate the invention.

From the foregoing it will be seen that, by properly varying the width of the shutter slots, undesirable fluctuations in the light flux emanating from the projector can be fully or at least partially eliminated.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A continuous projector for motion picture film comprising a source of light, means for imparting a continuous motion to a film, a plurality of optical systems arranged successively to project images of said film, means for selecting successive ones of said optical systems for image projection therethrough during successive intervals of time and for disclosing varying areas of said selected systems during the respective intervals of their effectiveness, and means for projecting an image of said source of light substantially in the plane of said selected optical systems and covering said systems, said disclosing means being so constructed that the variations of said disclosed areas of said selected optical systems are in accordance with the relative positions of said selected systems with respect to said image of said light source, thereby to maintain the light flux emanating from said projector substantially constant.

2. A continuous projector for motion picture film comprising means for imparting a continuous motion to a film, a plurality of optical systems arranged successively to project images of said film, means for moving said optical systems in accordance with the motion of said film, at least partially to compensate said motion, a source of light having a nonuniform intensity distribution for illuminating said film, said nonuniform intensity distribution giving rise to undesirable variations in the light flux emanating from said projector, and a slotted shutter timed with the motion of said optical systems for selecting successive ones of said optical systems for image projection therethrough during successive intervals of time and for disclosing varying areas of said selected optical systems during the respective intervals of their effectiveness, said shutter being so constructed that the variations of the disclosed areas of said selected systems tend to maintain the light flux emanating from said projector substantially constant.

3. A continuous projector for motion picture film comprising a source of light, means for imparting continuous motion to a film, a plurality of overlapping lens discs arranged to successively project images of said film, a shutter for selecting successive overlapping lenses in said discs for image projection therethrough during successive intervals of time and having arcuate slots therein of varying width for disclosing varying areas of said selected overlapping lenses during the respective intervals of their effectiveness and means for projecting an image of said source of light substantially in the plane of said selected optical systems and covering said systems, said slots being so disposed that the variations of said disclosed areas of said selected optical systems are in accordance with the relative positions of said selected lenses with respect to said image of said light source, thereby to maintain the light flux emanating from said projector substantially constant.

HARRY S. BAMFORD.